United States Patent [19]

Takano et al.

[11] Patent Number: 4,644,827
[45] Date of Patent: Feb. 24, 1987

[54] HYDRAULIC CONTROL SYSTEM FOR AN INFINITELY VARIABLE BELT-DRIVE TRANSMISSION

[75] Inventors: Toshio Takano, Hamuramachi; Ryuzo Sakakiyama, Tokyo, both of Japan

[73] Assignee: Fuji Jukogyo Kabushiki Kaisha, Tokyo, Japan

[21] Appl. No.: 592,155

[22] Filed: Mar. 22, 1984

[30] Foreign Application Priority Data

Mar. 23, 1983 [JP]  Japan .................. 58-48400

[51] Int. Cl.⁴ .................. B60K 41/12; B60K 41/18
[52] U.S. Cl. .................. 74/866; 474/18; 474/28
[58] Field of Search .............. 474/18, 28; 74/866, 74/752 A; 361/242

[56] References Cited

U.S. PATENT DOCUMENTS

| | | | |
|---|---|---|---|
| 4,369,675 | 6/1983 | Van Deursen | 74/864 |
| 4,387,608 | 6/1983 | Mohl et al. | 474/18 X |
| 4,459,879 | 7/1984 | Miki et al. | 474/28 X |
| 4,487,303 | 12/1984 | Boueri et al. | 74/866 X |
| 4,506,563 | 3/1985 | Hiramatsu | 74/866 X |
| 4,513,639 | 4/1985 | Hiramatsu | 74/866 |
| 4,515,041 | 5/1985 | Frank et al. | 74/866 |

FOREIGN PATENT DOCUMENTS

| | | | |
|---|---|---|---|
| 2113159 | 9/1978 | Fed. Rep. of Germany | 74/752 A |
| 0109850 | 8/1980 | Japan | 74/866 |
| 2093134 | 8/1982 | United Kingdom | 74/866 |

Primary Examiner—Kenneth J. Dorner
Assistant Examiner—Dirk Wright
Attorney, Agent, or Firm—Martin A. Farber

[57] ABSTRACT

A system for controlling the transmission ratio of an infinitely variable belt drive transmission having a primary pulley, a secondary pulley, a belt engaged with both pulleys, a pressure oil circuit having a pump for supplying pressure oil, and a transmission ratio control valve responsive engine speed for controlling the pressure oil and for changing the transmission ratio. The system has an electronic control circuit responsive to ignition pulses of the engine for producing output pulses dependent on the engine speed, and an electromagnetic valve responsive to the output pulses for controlling the amount of pressure oil applied to the transmission ratio control valve, thereby controlling the transmission ratio in dependency on the engine speed.

3 Claims, 7 Drawing Figures a b c d e

HYDRAULIC CONTROL SYSTEM FOR AN INFINITELY VARIABLE BELT-DRIVE TRANSMISSION

DETAILED DESCRIPTION OF THE INVENTION

The present invention relates to a system for controlling the transmission ratio of an infinitely variable transmission for a vehicle.

U.S. Pat. No. 4,369,675 discloses a control system for an infinitely variable transmission. The transmission comprises an endless belt running over an input pulley and an output pulley. Each pulley is so designed that the running diameter of the driving belt on the pulley varies in dependency on driving conditions. In the system, a transmission ratio control valve and a pressure regulator valve are provided so as to change the transmission ratio in dependency on throttle position and engine speed of a vehicle. The engine speed is detected by Pitot pressure dependent on centrifugal force exerted on oil in an annular groove which is provided in the input pulley.

FIG. 1 shows Pitot pressure for engine speed. The Pitot pressure has a second degree curve. As seen from the graph, the Pitot pressure varies a lot with the variation of the engine speed in a middle and high speed range. Accordingly, the Pitot pressure can be used for the control of this valves in the speed range. However, in a low speed range shown by hatching lines, the Pitot pressure is low and does not vary much with the variation of the engine speed. Accordingly, the transmission ratio control valve and the pressure regulator valve can not be finely controlled by the Pitot pressure in the low engine speed range, causing unstable control of the transmission ratio.

As a method for improving the characteristic in the low engine speed range, increasing the diameter of the annular groove for detecting Pitot pressure or the increasing of the pressure receiving areas of a spool of each valve may be proposed. However, such a measure as this increasing has an effect also on the characteristic in the middle and high engine speed range and hence preferable improvement can not be expected.

On the other hand, the infinitely variable belt-drive transmission has a transmission control characteristic as shown in FIG. 2.

FIG. 2 shows relationships between vehicle speed and engine speed of a vehicle provided with an infinitely variable transmission. A clutch provided between an engine crankshaft and the transmission begins to engage when the engine speed reaches a speed $V_1$ which is a little higher than an idle speed $V_i$, and the clutch engages entirely at a point $P_1$ when the engine speed reaches a predetermined speed $V_2$. Then, the vehicle is driven at the highest transmission ratio. Therefore, engine speed and vehicle speed increase as an accelerator pedal is depressed. Since the transmission ratio is kept at the highest transmission ratio of the infinitely variable transmission, the engine speed and vehicle speed increase along a straight line $l_1$. When the relationship between the depression degree of the accelerator pedal and the engine speed reaches a proper condition, the transmission ratio starts to change to decrease the ratio at a point $P_2$. Accordingly, the line representing the engine speed and vehicle speed on the line $l_1$ changes to a horizontal line. When the transmission ratio reaches to the lowest ratio at a point $P_3$, the engine speed and vehicle speed change along a line $l_2$. Upon decelerating while the transmission ratio is lowest, both values of the engine speed and the vehicle speed descend along the line $l_2$. Further, when the engine speed decreases to a point $P_4$, that corresponds to the engine speed $V_2$, at which the clutch is engaged, the transmission ratio infinitely increases. Thus the vehicle speed decreases along a horizontal line. When the vehicle speed reaches the line $l_1$ which represents the highest transmission ratio, the engine speed also decreases along the line $l_{10}$. When the engine speed decreases to the speed $V_1$, the clutch is disengaged.

In order to improve the fuel consumption in such a transmission characteristic, it is desirable to locate the lower limit point $P_4$ at the lowest transmission ratio at an engine speed position as low as possible. To accomplish the transmission control at low engine speed, signal pressure in a low speed range must be exactly obtained. The Pitot pressure as a signal pressure in the prior art is unstable in a low engine speed range. Accordingly, in the system of the prior art, it is difficult to lower the lower limit point $P_4$.

SUMMARY OF THE INVENTION

An object of the present invention is to provide a system which may produce a stable signal pressure, so that the transmission ratio in a low engine speed range can be exactly controlled.

Another object of the present invention is to provide a system by which the lower limit point at the lowest transmission ratio can be moved to a engine speed lower than the prior art thereby improving the fuel consumption.

The other objects and features of this invention will be apparently understood from the following description with reference to the accompanying drawings.

DETAILED DESCRIPTION OF THE PREFERRED EMBODIMENT

Figure 3:
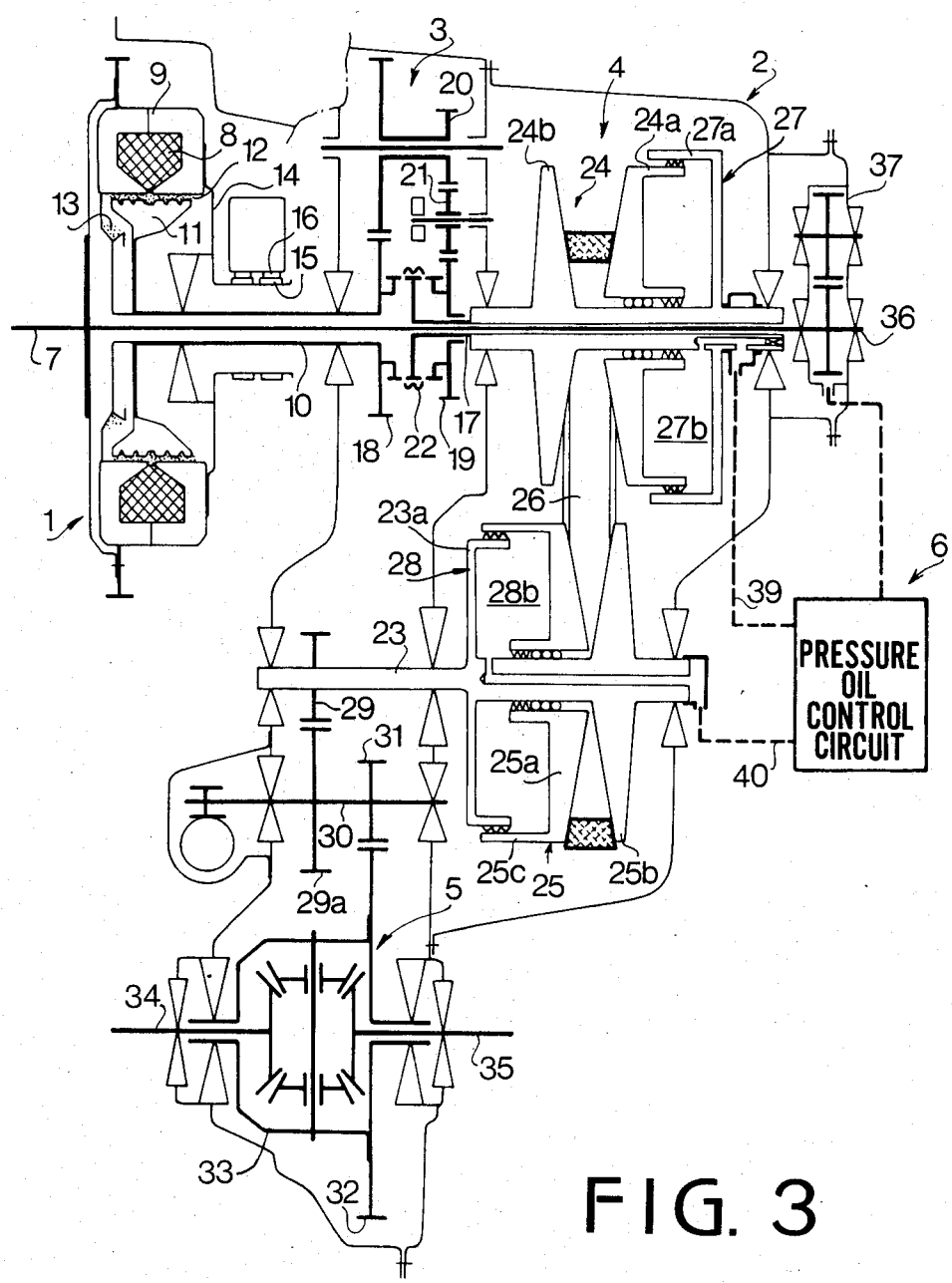
FIG. 3 is a schematic illustration of an infinitely variable belt-drive transmission.

Referring to FIG. 3, the infinitely variable belt-drive automatic transmission for a vehicle to which the present invention is applied, comprises an electromagnetic powder clutch 1, an infinitely variable belt-drive transmission 2, a reversing mechanism 3, pulleys and a belt device 4, a final reduction device 5, and a pressure oil control circuit 6. The crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and driven member 11. The powder chamber 13 is filled with magnetic powder material. The driven member 11 is secured to an input shaft 10 of the belt-drive transmission. A holder 14 secured to the drive member 9 carries slip rings 15 which are electrically connected to the coil 8. The coil 8 is supplied through brushes 16 and slip rings 15 with control current from a control circuit.

When the magnetizing coil 8 is excited by clutch current, drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the infinitely variable transmission 2, the reversing mechanism 3 is provided between the input shaft 10 and a main shaft 17 of the infinitely variable transmission 2. The main shaft 17 is cylindrical and is disposed coaxially with the input shaft 10. The reversing mechanism 3 comprises a drive gear 18 integral with input shaft 10 and a driven gear 19 rotatably mounted on the main shaft 17 for reverse drive. Gear 18 is engaged with gear 19 through a counter gear 20 and an idler gear 21. An axially movable clutch 22 can be moved is splined on the main shaft 17; by shifting the clutch 22 from the neutral position (P (parking) or N (neutral) range) shown and to engage it with the gear 18, so that the main shaft 17 is coupled directly with the input shaft 10 to establish forward drive condition in the D (drive) range, while by shifting the clutch 22 in the opposite direction and engaging it with gear 19, the direction of rotation of the main shaft 17 is reversed by the gears 18 to 21 to establish reverse drive condition (R range).

The main shaft 17 has an axial passage in which an oil pump driving shaft 36 is mounted which is connected to the crankshaft 7. An axially fixed conical disc 24b is secured to the main shaft 17 and an axially movable conical disc 24a is axially slidably mounted on the shaft portion of the disc 24b fixed to the main shaft; the discs 24a and 24b together form a primary pulley 24. The movable conical disc 24a also slides in a cylinder 27a secured to the main shaft 17 to form therewith a cylinder chamber 27b acting as a pressure oil servo device 27, with the movable conical disc 24a acting as a piston in the cylinder chamber 27b. Chamber 27b communicates with a gear pump 37 through a passage 39 and the pressure oil control circuit 6. The gear pump 37 is driven by the shaft 36.

An output shaft 23 is disposed in parallel with the main shaft 17. A fixed conical disc 25b is formed on the output shaft 23 opposite the movable disc 24a and a movable opposite disc 25a. The movable disc 25a is also conical and has a opposite disc 24b. Movable conical disc 25a has a cylindrical portion 25c in which a piston 23a of the output shaft 23 is slidably engaged to form a pressure oil servo device 28. The discs 25a and 25b form a secondary pulley 25. A chamber 28b defined by the movable conical disc 25a and piston 28a is communicated with the gear pump 37 through a passage 40 and the pressure oil control circuit 6. A drive belt 26 engages the primary pulley 24 and the secondary pulley 25.

Secured to the output shaft 23 is a drive gear 29 which engages with a gear 29a on an intermediate shaft 30. An output gear 31 secured to the shaft 30 engages with a final reduction gear 32. Rotation of the final gear 32 is transmitted to axles 34 and 35 of the vehicle, driving wheels through a differential 33.

Figure 4:
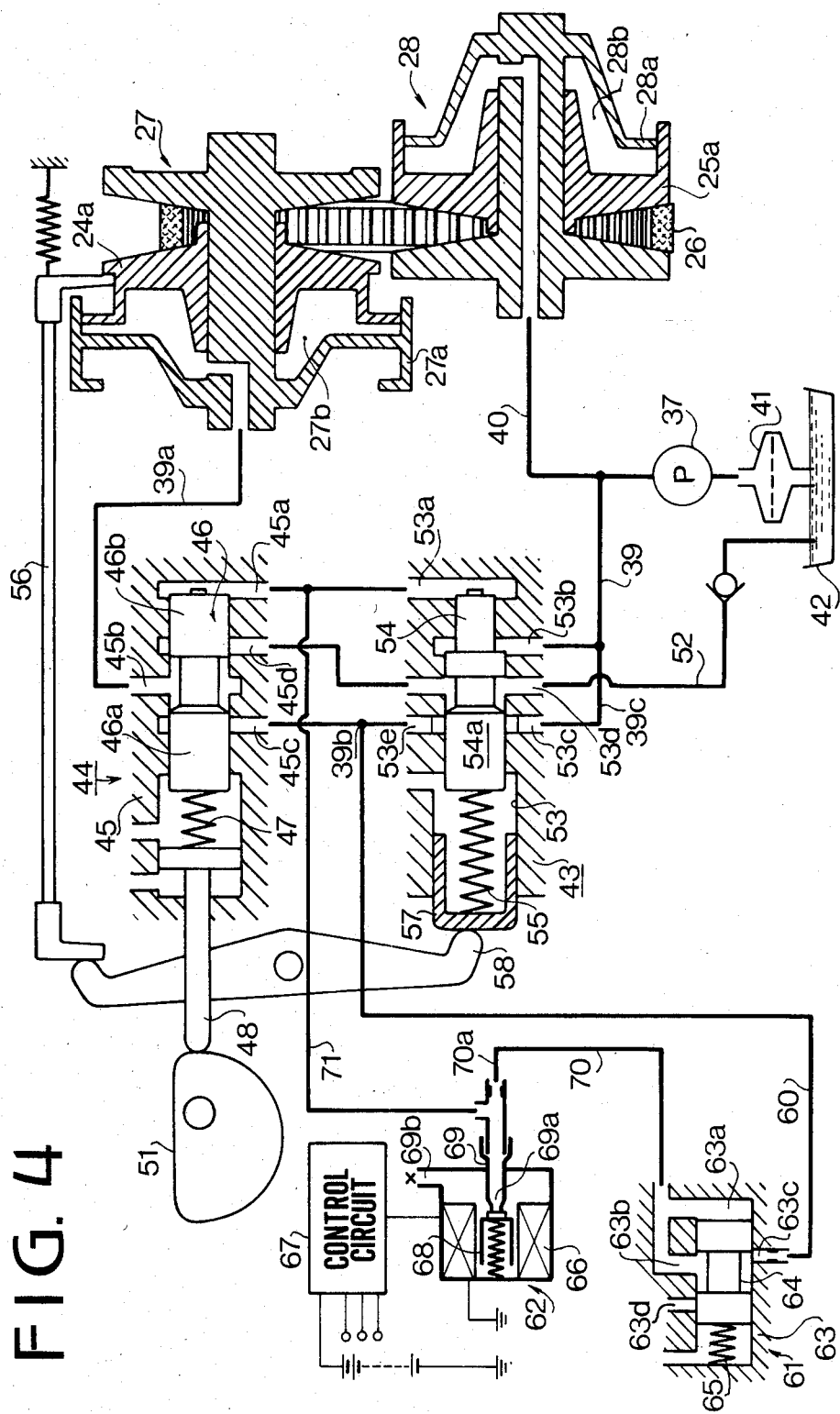
FIG. 4 is a schematic diagram showing a control system according to the present invention.

Referring to FIG. 4, the chamber 27b of servo device 27 is applied with pressure oil by the gear pump 37 from an oil reservoir 42 passing through a filter 41a, conduit 39a, pressure regulator valve 43 and a transmission ratio control valve 44. Chamber 28b of the servo device 28 is applied with pressure oil through a conduit 40 without passing valves 43 and 44. The movable conical disc 24a is so designed that the pressure receiving area thereof is larger than that of the movable conical disc 25a.

The transmission ratio control valve 44 comprises a valve body 45a, spool 46a, spring 47 for urging the spool in the downshift direction, and an actuating member 48 for the spring 47. The actuating member 48 engages a shift cam 51. The shift cam 51 is operatively connected to an accelerator pedal (not shown) of the vehicle so as to be rotated in dependency on the magnitude of depression of the pedal. A port 45b of the valve 44 is selectively communicated with a pressure oil supply port 45c or a drain port 45d in accordance with the position of lands 46a and 46b of the spool 46. Port 45b communicates with chamber 27b through a conduit 39a, port 45c communicates with the pressure regulator valve 43 through a conduit 39b, and drain port 45d communicates with the oil reservoir 42 through a port 53d, and conduit 52.

The pressure regulator valve 43 comprises a valve body 53a, spool 54, and a spring 55 for urging the spool 54 in one direction. The spool 54 is applied with pressure of the pressure oil supplied through conduit 39 and a port 53b, so that the spool 54 is moved to the left by the oil pressure at the port 53b. One end of the spring 55 engages with a slidable cylinder 57 which is moved through an arm 58 and rod 56. The rod 56 engages the disc 24a so as to detect the transmission ratio during operation. The port 53 which is connected with the conduit 39 through a conduit 39c communicates with the conduit 39b and selectively communicates with the port 53d in accordance with the position of a land 54a.

A port 53e corresponding to the port 53c is communicated with a modulator valve 61 through conduits 39b and 60. The modulator valve 61 comprises a body 63, a spool 64 and a return spring 65. An inlet port 63c connected to the conduit 60 is selectively communicated with an outlet port 63b or drain port 63d. A free end chamber 63a and the outlet port 63b are communicated with an electromagnetic valve 62.

The electromagnetic valve 62 comprises a coil 66, piston 68, a piston 68, a tube 69 having a port 69a corresponding to an end of the piston 68, and a drain port 69b. The port 69a is communicated with the port 63b and the chamber 63a of the modulator valve 61 through a conduit 70 having an orifice 70a. The coil 66 is applied with a duty ratio control signal from a control circuit 67. The port 69a is further communicated with free end chambers 45a and 53a of the valves 44 and 43 respecfully through a passage 71. The electromagnetic valve 62 is so arranged that when the coil is excited, the piston 68 is moved to the left to open the port 69a.

Figure 5:
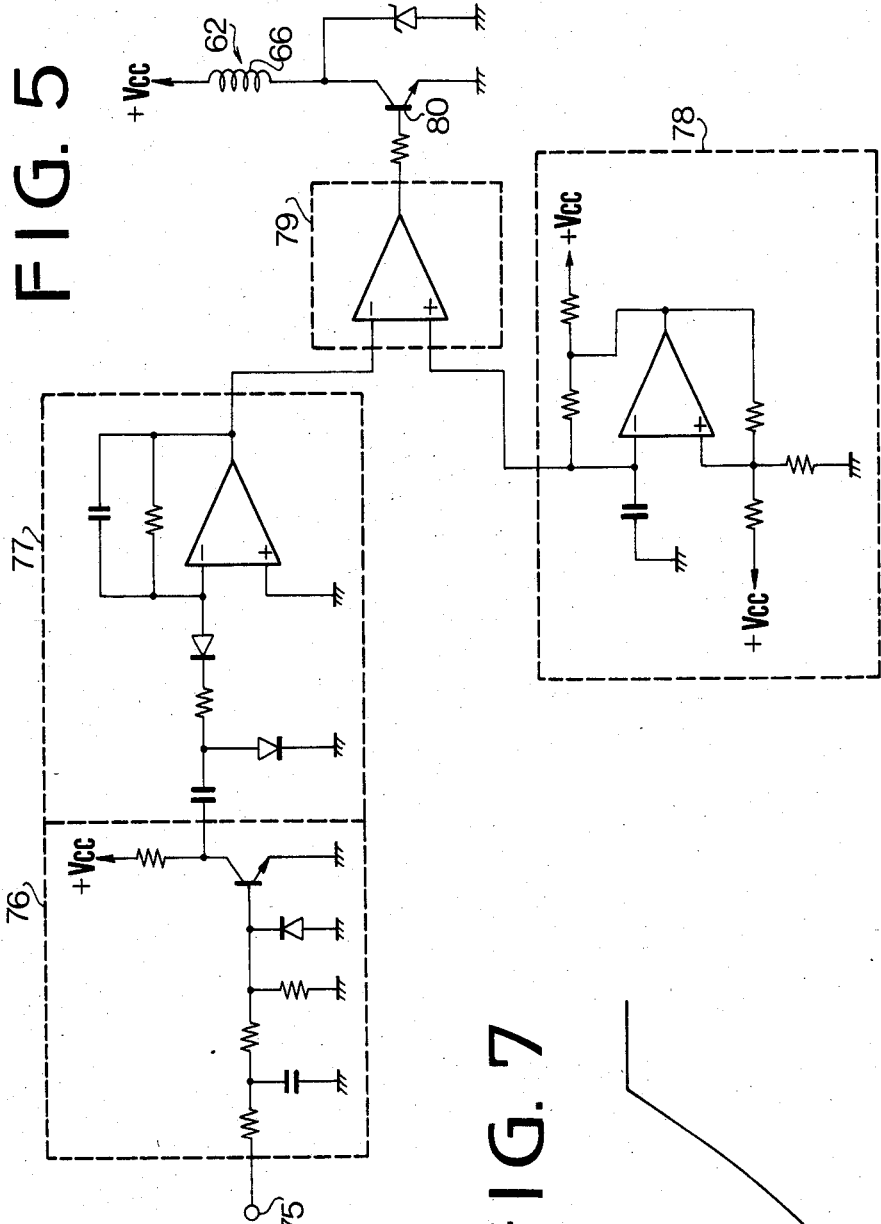
FIG. 5 is an electronic control circuit used in the control system.
Figure 7:
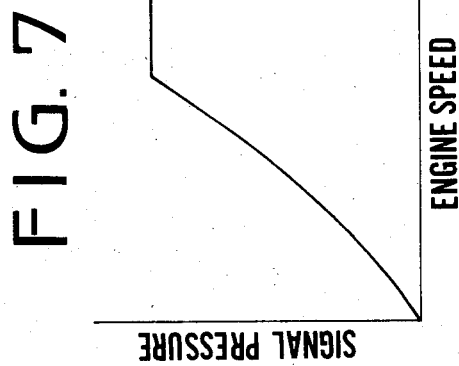
FIG. 7 is a graph showing a signal characteristic.
Figure 6:
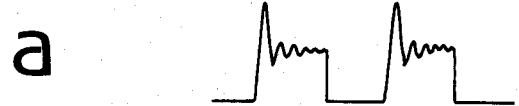
FIG. 6 shows waveforms at various position of the circuit of FIG. 5.
Figure 6:
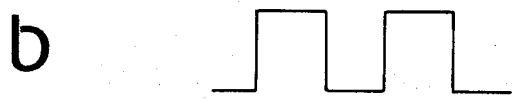
Figure 6:
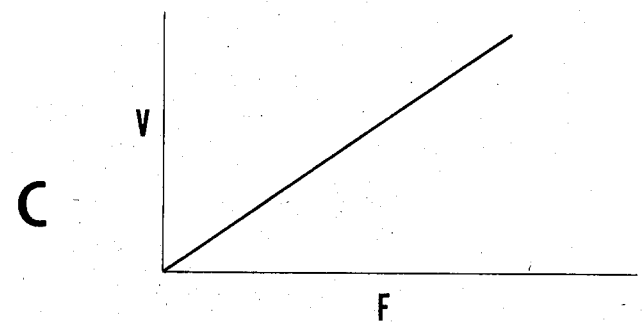
Figure 6:
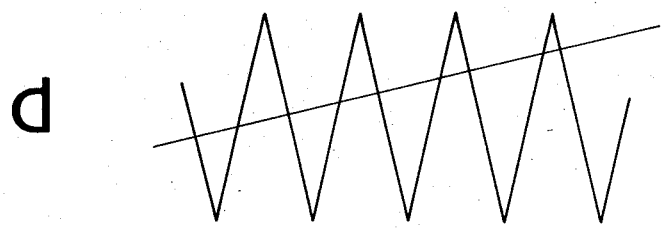
Figure 6:
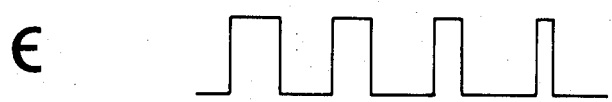

Referring to FIG. 5 showing the control circuit 67, an input terminal 75 is applied with ignition pulses (FIG. 6(a)) dependent on engine speed, which are shaped by a waveform shaping circuit 76 into square pulses (FIG. 6(b)). The output pulses of the shaping circuit 76 are converted to an analogue voltage by a frequency-to-voltage converter 77 as shown in FIG. 6(c). The output voltage of the converter 77 is compared with triangular pulses from a triangular wave pulse generator 78 at a comparator 79 as shown in FIG. 6(d). Thus, an comparator 79 produces output pulses having a duty ratio which decreases with the increase of the engine speed as shown in FIG. 6(e). The output pulses of the comparator 79 are applied to a base of a transistor 80 to turn it on and off. The transistor 80 is electrically connected to the coil 66 in series, thereby intermittently exciting the coil. Thus, signal pressure dependent on the engine speed can be obtained as shown in FIG. 7. Thus pressure oil is applied to chambers 45a and 53a from the pump 37 passing through valves 43, 61 and 62. If the oil pressure in the chamber 63a is higher than the biasing pressure of the return spring 65, the spool 64 is moved to the left to close the port 63c and to open the port 63d. Thus, the pressure of the oil applied to the electromagnetic valve 62 is maintained at a constant value.

During starting of the vehicle, the engine speed is low, so that the duty ratio of the pulses (FIG. 6(e)) from the comparator 79 is large. Accordingly, the opening period of the port 69a of the electromagnetic valve 62 is long, so that a large amount of pressure oil is drained from ports 69a and 69b. Thus, the signal pressure of pressure oil from the electromagnetic valve 62 is low, resulting in movement of spool 46 of transmission ratio control valve 44 to the right. Accordingly, port 45b communicates with port 45d to drain the oil in the chamber 27b. The disc 24a moves to the left to provide the highest transmission ratio.

When the accelerator pedal is depressed, shift cam 51 moves the actuating member 48 to the right. With increasing of engine speed, the signal pressure from the valve 62 increases, thereby moving spools 54 and 46 to the left against springs 55 and 47, respectively. Thus, port 45b is communicated with port 45c to apply the pressure oil to chamber 27b. Since the pressure receiving area of the disc 24a is larger than that of the disc 25a, the disc 24a is moved to the right and the disc 25a is moved to the right by means of the drive belt 26 to decrease the transmission ratio. The movement of the disc 24a causes the rod 56 to move to the right, reducing the compression force of the spring 55. Thus, the spool of the regulator valve 43 moves to the left to regulate the pressure of the pressure oil from the pump 37.

Figure 1:
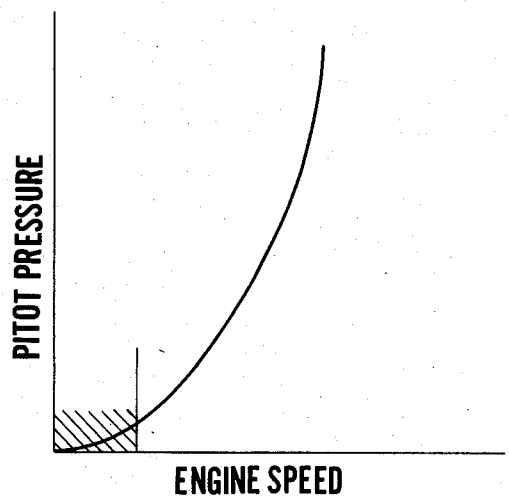
FIG. 1 is a graph showing the relationship between Pitot pressure and engine speed in a conventional infinitely variable transmission.
Figure 2:
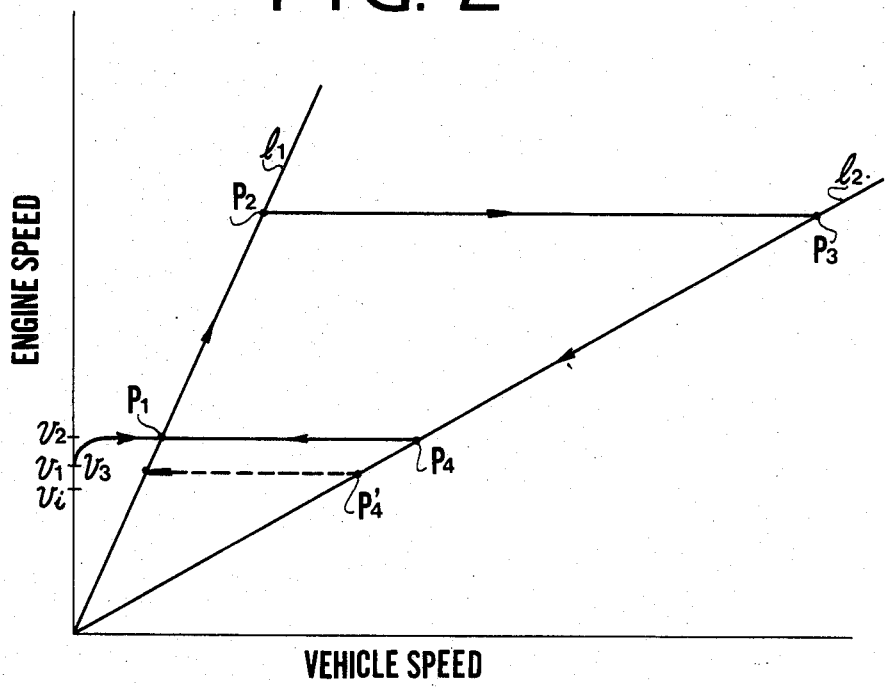
FIG. 2 shows a transmission control characteristic of the infinitely variable transmission.

When the engine speed decreases to a predetermined low speed $V_3$ (FIG. 2), which is lower than the speed $V_2$, the signal pressure from the valve 62 becomes lower than the spring force of spring 47 to shift the spool 46 to the right. Thus, the pressure in the chamber 27b decreases, causing the disc 24a to move to the left. Accordingly, transmission ratio begins to increase at point $P_4$ of FIG. 2.

In accordance with the present invention, signal pressure for operating the transmission ratio control valve is produced in dependency on ignition pulses in proportion to the engine speed by electronic means. Therefore, stable signal pressure can be obtained, so that transmission ratio control at low engine speed becomes stable. Accordingly, it is possible to lower the lower limit point at the lowest transmission ratio during deceleration of the vehicle. Thus, fuel consumption can be improved. The signal pressure is produced from the constant pressure oil regulated by the modulator valve. Therefore, the signal pressure exactly represents the engine speed, thereby exactly controlling the transmission ratio.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling the transmission ratio of an infinitely variable transmission for transmitting the power of an internal combustion engine comprising a primary pulley having a hydraulically shiftable disc and a hydraulic cylinder for shifting the disc, a secondary pulley having a hydraulically shiftable disc and a hydraulic cylinder for operating the latter disc, a belt engaged with both pulleys, and a pressure oil circuit having a pump for supplying pressurized oil, a tranmission ratio control valve having a spool responsive to engine speed for controlling the pressurized oil so as to move the disc of the primary pulley to change the transmission ratio, the improvement comprising:

a hydraulic circuit for applying control oil to one end of the spool of the transmission ratio control valve so as to axially move the spool for the controlling of the pressurized oil;

an electronic control circuit responsive to ignition pulses of said engine for producing an output signal dependent on the engine speed;

a modulator valve provided in the hydraulic circuit for producing a constant pressure of the control oil;

an electromagnetic valve provided in the hydraulic circuit and having a coil responsive to said output signal for controlling the constant pressure of the control oil applied to the spool of the transmission ratio control valve, thereby to control the transmission ratio.

2. The system for controlling the transmission ratio according to claim 1 wherein said electronic control circuit comprises a circuit for producing output pulses dependent on ignition pulses and a transistor responsive to said output pulses for intermittently exciting said coil.

3. The system for controlling the transmission ratio according to claim 1 wherein said electromagnetic valve is so arranged to drain the pressure oil in dependency on the excitation of said coil.

* * * * *